Aug. 21, 1956     H. T. JENSEN ET AL     2,759,359
ROTOR BALANCING MEANS
Original Filed Aug. 2, 1946
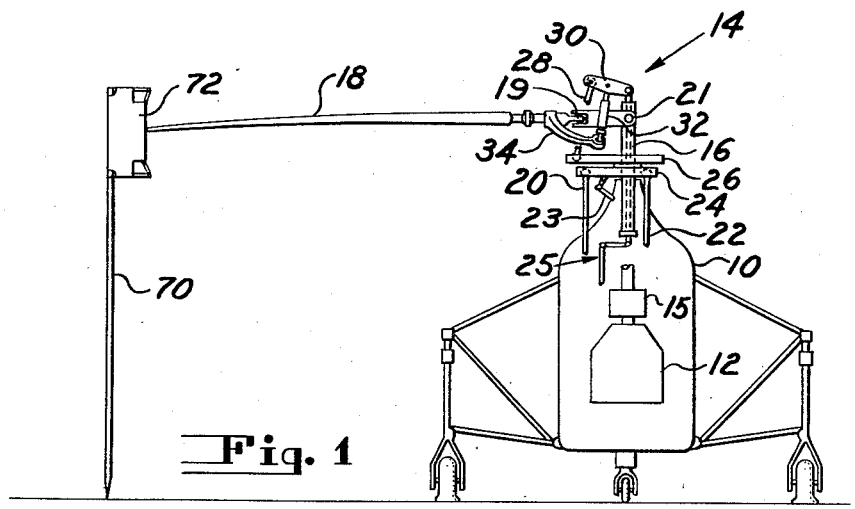
Fig. 1
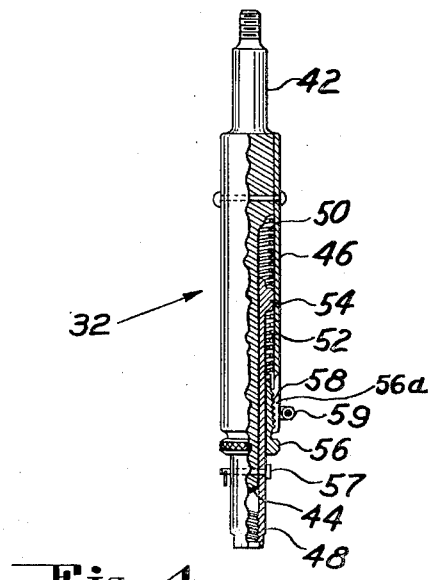
Fig. 3
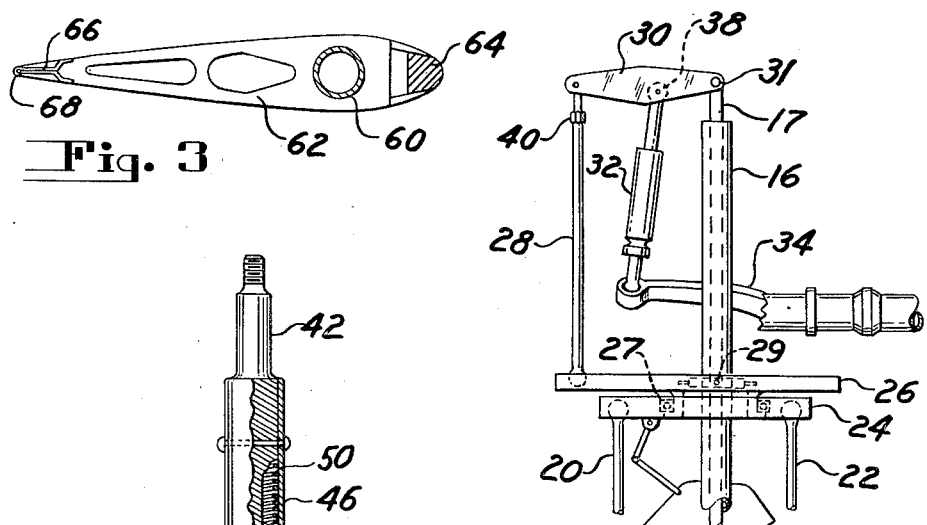
Fig. 2
Fig. 4
H. T. JENSEN
H. W. BONNETT
INVENTORS
BY M. B. Tasker
ATTORNEY United States Patent Office 2,759,359
Patented Aug. 21, 1956

2,759,359

ROTOR BALANCING MEANS

Harry T. Jensen, Milford, and Horace W. Bonnett, Fairfield, Conn., assignors to United Aircraft Corporation, East Hartford, Conn., a corporation of Delaware Original application August 2, 1946, Serial No. 688,146, now Patent No. 2,669,120, dated February 16, 1954. Divided and this application June 26, 1953, Serial No. 364,310

7 Claims. (Cl. 73—147)

This invention relates generally to direct lift aircraft having supporting rotors which may be power driven, and more particularly to a means and method for balancing the rotor blades of such craft and is a division of our copending application Serial No. 688,146, filed August 2, 1946 and assigned to the assignee of this application which issued February 16, 1954 as Patent No. 2,669,120.

An object of this invention is to provide a device which will permit reasonably accurate balancing of the pitching moments of the rotor blades without the use of any elaborate electrical or magnetic instrumentation, and is particularly adapted for use in places where these are not available, such as in general field operations away from the manufacturer's test stands.

Another object is to provide a device, whereby accurate balancing of the blades may be obtained in their manufacture, so that interchangeability between production blades is possible.

Other objects and advantages will be apparent from the specification and claims and from the accompanying drawings which illustrate what is now considered to be a preferred embodiment of the invention.

In the drawings:

Fig. 1 is a schematic view showing a direct lift aircraft having a rotor provided with the balancing device of this invention, and showing the position of the tip of one blade being measured with respect to the ground;

Fig. 2 is a schematic side view of a typical rotor head linkage which includes both total and cyclic pitch control;

Fig. 3 is a cross section of a representative rotor blade; and

Fig. 4 is an elevation view of the device per se, with parts in section.

In rotary wing aircraft utilizing a power driven rotor such as helicopters in which provision may be made for autorotation, not only must the pitch of the individual blades be set at equal angles to some normal, such as the plane perpendicular to the rotary shaft, but also the pitching moments of all the blades must be equalized.

In rotary wing aircraft, such as a gyro-plane, where the pitch of the blades is set on the ground and is not controllable by the pilot, balancing of the blades with regard to the pitching moments in some craft may not be essential. The moments which actually exist will be transferred into the hub and will probably be, under normal conditions, of a magnitude which will not be felt in the aircraft or the controls. However, if these moments are or become excessive they may result in a twisting of the blade structure, resulting in dissymmetry in the blade pattern and a consequent serious vibration of the whole aircraft.

In a helicopter, however, where the pitch of the blades is linked through a control system directly to the pilot's joy stick any aerodynamic unbalance of a rotor blade will be transmitted back to the controls as a resultant unbalance of all the blades, and be felt as a force tending to rotate the stick in the direction of the unbalance. This stick movement will take place at the same speed as the revolutions of the rotor.

If the blades are of normal torsional rigidity, a pitching moment unbalance which is large enough to cause severe discomfort to the pilot in operating the ship, is in many cases too small to cause a deflection in the structure of the blade, or the control system, so that the blades will apparently be in perfect track and the blade tips follow the same rotative path which may be measured by the use of a tracking flag such as is described in Patent No. 2,552,739, issued May 15, 1951 to Reon B. Roberts. Thus, it can be seen that an uncomfortable and inconvenient rotation of the stick and a vibration of the whole craft may result even though all the rotor blades seem to be in perfect rotative alignment.

In order to remedy this shortcoming our invention provides for a flexible control linkage which may be permanently interposed in any control system, and which when rendered operative by a mechanic, will allow the blade incidence to be deflected by its pitch moment force. For example, with the flexible control linkage of the invention in use, the blade with the greatest pitch decreasing moment will fly in the lowest path thus giving on a tracking flag, due to the flexibility introduced, an exaggerated indication of the magnitude and direction of the undesired pitching moment. The use of the flexible control linkage makes it much easier to read the indication of the magnitude and direction of the blade pitching moment particularly in blades which are very rigid torsionally and where the rotor might maintain good track in spite of the unbalanced or unequal pitching moments of the blades.

After the pitching moments in all the blades have been equalized the device is then rendered inoperative when the operator reinserts locking pins and the helicopter flown with vibration free controls.

The device to be described and shown in Figs. 1 to 4 preferably is for use in the field. With the present construction, when blades are damaged in ground handling or in shipment, their aerodynamic moments may easily be altered without changing their structural characteristics, thus rendering them rough in operation. As there may not be any accurate measuring instrument at the base of operations, the instant device may be used to give sufficiently accurate indication of unbalance so that corrective measures may be applied by any mechanic familiar with the procedure.

In the device disclosed in Figs. 1 to 4, an aircraft 10 is provided with an engine 12 driving a rotor 14 through a transmission 15 and shaft 16. The helicopter described in this application is similar to the one shown in detail in Patent No. 2,517,509, issued August 1, 1950, to I. I. Sikorsky, but the structure will improve other types of rotary wing aircraft as well. In Fig. 1, the rotor 14 includes a blade 18, of which there may be two or more in number, linked to the shaft 16 by a vertical pivot 19 and a horizontal pivot 21. The total pitch of all the blades is controllable from the pilot's compartment through a suitable linkage 25 which operates a push-pull rod 17 reciprocable internally of the drive shaft 16 so as to raise or lower a pivot 31 and consequently a pivot 38 to simultaneously increase or decrease the pitch of all the blades which are mounted on bearings within their hubs so that they can rotate around their longitudinal axes. The cyclic pitch is operated by a control rod 20 and a control rod 22 as a result of lateral and fore and aft movements respectively of a conventional joy stick (not shown) in the pilot's compartment. These control rods tilt a plate 24 which is held by a scissors 23 that permits tilting but prevents rotation. Plate 24 is connected by suitable bearings 27 to a supporting plate 26 which is free to rotate with the shaft 16 and is mounted thereon by gimbals 29 so that plates 24 and 26 can tilt as a unit. Motion is thus transmitted from the pilot's control stick through the control rods 20 and 22, plates 24 and 26 and push rod 28 to raise or lower the linkage 30 around the pivot 31 and thereby raise or lower the connecting rod 32 which operates the control horn 34 to provide cyclic pitch variation. All the foregoing is clearly shown and is more clearly described in Patent No. 2,517,509 mentioned above.

In Fig. 3 is shown a typical cross section of a rotor blade having a spar 60 located near the quarter chord point from the leading edge which has a mass 64 distributed along the length of the blade in order to balance the blades around the feathering axis which may be the centerline of the spar 60. A trailing edge cable 68 is supported by formable metallic clips 66 carried by ribs 62 which may be bent to change the aerodynamic pitching moment of the rotor blade as required.

Fig. 4 shows a proving device which forms a feature of this invention. It consists of an inner push rod 42 which is cut out to form a long mandrel 44, and to which is riveted an outer casing 46. Springs 50 and 52 are mounted within the casing 46 and yieldingly support a hollow rod 48 by its flange 54. A knurled knob 56 with a threaded portion 58 screws into the lower part of the casing 46 and provides a take up adjustment for the springs 50 and 52. The lower portion of the casing 46 is split at 56a and has a simple clamping nut mounted on ears 59 which can lock the knob 56. As shown in this figure, the relative motion axially between the hollow rod 48 and the push rod 42 is prevented by a locking pin 57. Therefore, when the pin 57 is engaged the whole assembly 32 becomes equivalent to a solid push-pull rod and the horn 34 is rigidly linked to the control system. When the pin 57 is removed the horn 34 is yieldingly linked to the control system.

In operating the instant device the presently preferred method is to lock the plates 24 and 26 against angular movement with respect to the shaft 16 by inserting a block at some convenient point, or else locking the control stick in the pilot's cabin in some known manner. The tip path of the several rotor blades is then brought into a common plane by taking up on the rod ends 40 or in any other suitable location to adjust the blade pitch. This procedure of tracking the blades of a rotor so that all the blade tips lie in the same plane when rotated is more fully described in Patent No. 2,552,739, referred to above. When the blades are all in perfect track, i. e., the tips of all the blades pass the tracking flag at the same height, next the pin 57 is removed from each proving device 32 which is in control of the pitch of every blade. Each blade is then free to change its incidence a slight but measurable amount as allowed by the compression of springs 50 and 52. Any increase in the incidence of a blade due to a pitching moment of that blade will result in increased lift of that blade which will cause its tip to rise; whereas any decrease in blade incidence will result in decreased lift which will cause the blade tip to fall. By measuring the height of the tip of all blades above the ground, by observing colored chalk marks wiped from each blade tip by a tracking flag 72 held on a mast 70, the direction and magnitude of the aerodynamic pitching moments of the blade may be easily ascertained. The location of springs 50 and 52 is so designed that the torque of each blade about its feathering axis is manifest as a force compressing the springs in the push rod. Since the spring constants of the springs in the push rod controlling the blades are identical, a like force on each rod would deflect each spring a like distance.

In actual operation the blades of the helicopter may be checked for track and have their pitch adjusted by successive trials until all the blades track perfectly at, for example, 8 degree blade angle and 2000 R. P. M. of the engine, the pitch adjustment being obtained by adjusting the rod ends 40. The locking pins 57 in the push rods, corresponding to their respective blades are then removed allowing the springs to become operative. A tracking record is made with the tracking flag 72 at 2000 R. P. M. of the engine and 8 degrees of the blade angle. The geometry of the blades is then changed i. e. the trailing edge of the blades which track high on the flag 72 may then be adjusted in a downward direction by bending the clips 66, Fig. 3, while the trailing edge of the blades which track low are adjusted in an upward direction.

With a little experience a skilled operator will be able to tell the amount of trailing edge deflection which must be applied to a blade in order to correct the amount of aerodynamic pitching moment indicated by the colored mark that each blade leaves on the tracking flag. Many times one adjustment is sufficient to remove all objectionable vibration of the control stick at the given angle of blade pitch chosen.

When the proper adjustments have been made, the rotor will be in perfect track with the pins 57 removed showing that the blades are balanced aerodynamically. When the tracking flag shows that the blades are in good track the pins 57 are replaced, the controls are unlocked, and a check run is made at high blade angle. If the adjustments have all been made properly the control stick will remain quite still when held freely under all conditions of power i. e. R. P. M. and through the full range of blade angle change.

Once an aircraft is away from the factory and some blade damage has upset the aerodynamic balance, this procedure will enable the operator to smooth out all the first order stick vibrations without special instrumentation. However, the chances are that once adjustments have been made on the trailing edge of all the blades of a rotor system, those blades may be interchanged as a set with another set, but will not be interchangeable as individual blades with a blade from another set.

If one blade on a set is so severely damaged that it is no longer of use, it is then desirable to replace it with a new blade. The operator of the helicopter should not have need to purchase three blades because one has been damaged. The new blade must then necessarily be interchangeable with the damaged one, assuming that the other blades in the original set have not been tampered with in any way.

Such interchangeability of individual blades has never been achieved in previous practice but has now been made possible by the application of the following method in the production of rotor blades. This same method, with obvious modifications, may be applied to blades of many different constructions. The present description deals with fabric covered blades built around a round tubular spar, but will be equally applicable to all-plywood blades or all-metal blades, or any combination of the foregoing.

The method and mechanism described above in the preferred embodiment is for use in the field, where laboratory equipment is not available, and will produce results which are of reasonable accuracy. For interchangeability it is in all cases desirable to have a very accurate evaluation of both the dynamic and aerodynamic pitching moments of every blade produced.

In the manufacture of any type of rotor blades it has not been found difficult to maintain the chordwise mass balance of production blades so that their dynamic pitching moment, due to the mass being rotated at an angle to the plane of rotation, will be constant between blades. However, it is very much more difficult to maintain the profile section of the blades exactly equal. Any variation in the external contour of the blades built to normal manufacturing tolerances of plus or minus $1/64$ of an inch for example will cause a difference of aerodynamic moments. If this manufacturing error occurs near the tip of the blades the change of aerodynamic moment will be influenced to a greater degree than if the error occurs near the root end of the blade. This is due to the greater velocity of the tip in its rotative path.

While only one embodiment of the invention is shown and described herein, it will be understood that various changes in the construction and arrangement of the parts may be made within the scope of our invention.

We claim:

1. In a device for testing helicopter blades, a rotor including a rotor head for mounting at least two adjustable pitch blades, manually operable means for adjusting the pitch of said blades and for holding said blades at a selected pitch setting including a control mechanism for each blade operatively connected to a pitch control horn on the blade, said mechanisms each comprising two elements and resilient means connecting said elements enabling each blade as the blade rotates to pivot about its pitch changing axis an amount proportional to its aerodynamic pitching moment, and each control mechanism including disconnectable means rigidly connecting said elements.

2. In a device for testing helicopter blades, a rotor including a rotor head for mounting at least two adjustable pitch blades, manually operable means for adjusting the pitch of said blades and for holding said blades at a selected pitch setting including a control mechanism for each blade operatively connected to a pitch control horn on the blade, said mechanisms each comprising two elements and resilient means connecting said elements enabling each blade as the blade rotates to pivot about its pitch changing axis an amount proportional to its aerodynamic pitching moment, and each control mechanism including disconnectable means rigidly connecting said elements, and means for indicating the displacement of said resilient means.

3. In a device for testing helicopter blades, a rotor including a rotor head for mounting at least two adjustable pitch blades, manually operable means for adjusting the pitch of said blades and for holding said blades at a selected pitch setting including a control mechanism for each blade operatively connected to a pitch control horn on the blade, said mechanisms each comprising two elements and resilient means connecting said elements enabling each blade as the blade rotates to pivot about its pitch changing axis an amount proportional to its aerodynamic pitching moment, and each control mechanism including a removable pin rigidly connecting said elements.

4. In a device for testing helicopter blades, a rotor head for mounting at least two adjustable pitch blades, manually operable means for adjusting the pitch of said blades and holding said blades at a selected pitch setting including a connection to each blade, means for testing said blades for unbalanced pitching moments including two rigid telescoping elements in each connection, means releasably holding each of said two rigid elements together in a fixed relation, and resilient means connecting each two corresponding rigid elements, said resilient means enabling each blade when rotated to pivot about its pitch changing axis an amount proportional to its pitching moment when said holding means is released.

5. In a device for testing helicopter blades, a rotor head for mounting at least two adjustable pitch blades, manually operable means for adjusting the pitch of said blades and holding said blades at a selected pitch setting including a connection to each blade, means for testing said blades for unbalanced pitching moments including two rigid telescoping elements in each connection, a holding pin releasably holding said two elements together in a fixed relation, and resilient means connecting each two corresponding rigid elements, said resilient means enabling each blade when rotated to pivot about its pitch changing axis an amount proportional to its pitching moment when said holding pin is released.

6. In a device for testing helicopter blades, a rotor head for mounting at least two adjustable pitch blades, manually operable means for adjusting the pitch of said blades and holding said blades at a selected pitch setting including a connection to each blade, means for testing said blades for unbalanced pitching moments including two rigid telescoping elements in each connection, means releasably holding said two elements together in a fixed relation, one element comprising an outer casing, the other element comprising a rod extending into said casing, the end of said rod in said casing having a flange thereon, spring means located between said flange and said outer casing for resiliently connecting said elements, said spring means enabling each blade when rotated to pivot about its pitch changing axis an amount proportional to its pitching moment when said holding means is released.

7. In a device for testing helicopter blades, a rotor head for mounting at least two adjustable pitch blades, manually operable means for adjusting the pitch of said blades and holding said blades at a selected pitch setting including a connection to each blade, means for testing said blades for unbalanced pitching moments including two rigid telescoping elements in each connection, means releasably holding said two elements together in a fixed relation, one element comprising an outer casing, the other element comprising a rod extending into said casing, the end of said rod in said casing having a flange thereon, spring means located between said flange and said outer casing for resiliently connecting said elements, said releasable holding means comprising a pin, said spring means enabling each blade when rotated to pivot about its pitch changing axis an amount proportional to its pitching moment when said holding means is released.

References Cited in the file of this patent

UNITED STATES PATENTS

| | | |
|---|---|---|
| 226,534 | Moloney | Apr. 13, 1880 |
| 264,816 | Beaudry | Sept. 19, 1882 |
| 1,511,173 | McCarty | Oct. 7, 1924 |
| 1,990,291 | Larsen | Feb. 5, 1935 |
| 2,037,407 | Cremer | Apr. 14, 1936 |
| 2,133,168 | Gwinn | Oct. 11, 1938 |
| 2,380,582 | Cierva | July 31, 1945 |
| 2,455,053 | Flint | Nov. 30, 1948 |
| 2,552,739 | Roberts | May 15, 1951 |
| 2,669,120 | Jensen et al. | Feb. 16, 1954 |